US 12,551,783 B2
Feb. 17, 2026

(12) United States Patent
Frachi

(54) METHOD FOR AUTOMATICALLY PREDICTING THE EMOTIONAL EFFECT PRODUCTED BY A VIDEO GAME SEQUENCE

(71) Applicant: OVOMIND SA, Plan-les-Ouates (CH)

(72) Inventor: Yann Frachi, Marseilles (FR)

(73) Assignee: OVOMIND SA, Plan-les Ouates (CH)

( * ) Notice: Subject to any disclaimer, the term of this patent is extended or adjusted under 35 U.S.C. 154(b) by 277 days.

(21) Appl. No.: 18/564,176

(22) PCT Filed: May 25, 2022

(86) PCT No.: PCT/IB2022/054882
§ 371 (c)(1),
(2) Date: Nov. 27, 2023

(87) PCT Pub. No.: WO2022/249081
PCT Pub. Date: Dec. 1, 2022

(65) Prior Publication Data
US 2024/0245986 A1    Jul. 25, 2024

(30) Foreign Application Priority Data

May 27, 2021   (FR) ..................... 2105553

(51) Int. Cl.
*A63F 13/60*   (2014.01)
*A63F 13/212*  (2014.01)
*A63F 13/67*   (2014.01)

(52) U.S. Cl.
CPC ............ *A63F 13/212* (2014.09); *A63F 13/67* (2014.09)

(58) Field of Classification Search
CPC .......... A63F 13/21; A63F 13/60; A63F 13/67; A63F 13/70; A63F 13/352; A63F 13/42;
(Continued)

(56) References Cited

U.S. PATENT DOCUMENTS

2017/0007165 A1*  1/2017  Jain ................. A61B 5/165
2020/0206631 A1*  7/2020  Sumant ............. A63F 13/55
(Continued)

OTHER PUBLICATIONS

Hossain M. Shamim et al., "Audio-Visual Emotion-Aware Cloud Gaming Framework", IEEE Transactions on Circuits and Systems for Video Technology, vol. 25, No. 12, Dec. 1, 2015, 14 pages.
(Continued)

*Primary Examiner* — Omkar A Deodhar
(74) *Attorney, Agent, or Firm* — Falcon Rappaport & Berkman LLP

(57) ABSTRACT

A method is provided for automatically predicting the emotional effect produced by a video game sequence, comprising labeling sequences of the game by automatically generating descriptors at time sequences of the game, the labeling comprising applying digital processing to the audio stream of the video game sequence using a neural network architecture and an NLP coding layer, to extract a first series of timestamped descriptors, and applying digital processing to the video stream to provide a second series of timestamped descriptors for characterizing the scenes of each image of the video stream, and transmitting them as M-tuples to a neural network. The method also comprises processing biosignals to extract timestamped signals and transmit them as N-tuples to a neural network and processing the M-tuples corresponding to the timestamped descriptors and the N-tuples to provide at least one indicator predicting the emotional state brought about by a type of audiovisual sequence.

5 Claims, 2 Drawing Sheets

(58) Field of Classification Search
CPC .......... A63F 13/86; A63F 13/87; A63F 13/57;
A63F 13/213; A63F 13/65; A63F 13/53;
A63F 13/46; A63F 13/215; A63F 13/25;
A63F 13/33; A63F 13/212; G06V 40/176;
A63B 71/0622; A63B 24/0084; A63B
24/0062; A63B 24/0006; A61B 5/11;
A61B 5/681; A61B 5/165; A61B 5/742;
A61B 5/7282; A61B 5/02055; A61B
5/6803; A61B 5/7264; A61B 5/6898;
A61B 5/486; A61B 5/6826
See application file for complete search history.

(56) References Cited

U.S. PATENT DOCUMENTS

| | | | | |
|---|---|---|---|---|
| 2020/0298118 | A1* | 9/2020 | Yannakakis | G06N 20/10 |
| 2020/0405212 | A1* | 12/2020 | Chappell, III | A63F 13/79 |
| 2021/0001229 | A1* | 1/2021 | Somers | G06N 3/082 |
| 2021/0335086 | A1* | 10/2021 | Idris | G06T 7/70 |
| 2021/0394060 | A1* | 12/2021 | Yilmazcoban | G06F 18/214 |
| 2022/0088474 | A1* | 3/2022 | Dicken | A63F 13/79 |
| 2022/0088484 | A1* | 3/2022 | Dicken | A63F 13/67 |
| 2022/0088485 | A1* | 3/2022 | Dicken | A63F 13/67 |
| 2022/0254082 | A1* | 8/2022 | Bhat | H04N 21/8146 |
| 2022/0280083 | A1* | 9/2022 | Kumari | G16H 20/30 |
| 2022/0387887 | A1* | 12/2022 | Kipnis | G06N 5/025 |
| 2025/0114043 | A1* | 4/2025 | Jedziniak | A61B 5/7246 |

OTHER PUBLICATIONS

Yao Wang et al., "Multimedia Content Analysis Using Both Audio and Visual Clues", IEEE Signal Processing Magazine, vol. 17, No. 16, Nov. 1, 2000, 25 pages.
Written Opinion, Application No. FR2105553, Dated Feb. 10, 2022, 6 pages.
Preliminary Search Report, Application No. FR2105553, Dated Feb. 10, 2022, 3 pages.
International Search Report, International Application No. PCT/IB2022/054882, Mailed Sep. 9, 2022, 7 pages.
Written Opinion, International Application No. PCT/IB2022/054882, Mailed Sep. 9, 2022, 8 pages.
Lee Dongkun et al, "Text to Game Characterization: A Starting Point for Generative Adversarial Video Composition", 2018 IEEE International Conference on Big Data and Smart Computing (BIGCOMP), IEEE, Jan. 15, 2018 (Jan. 15, 2018), p. 717-720 (Abstract only).

* cited by examiner

[FIG. 1]
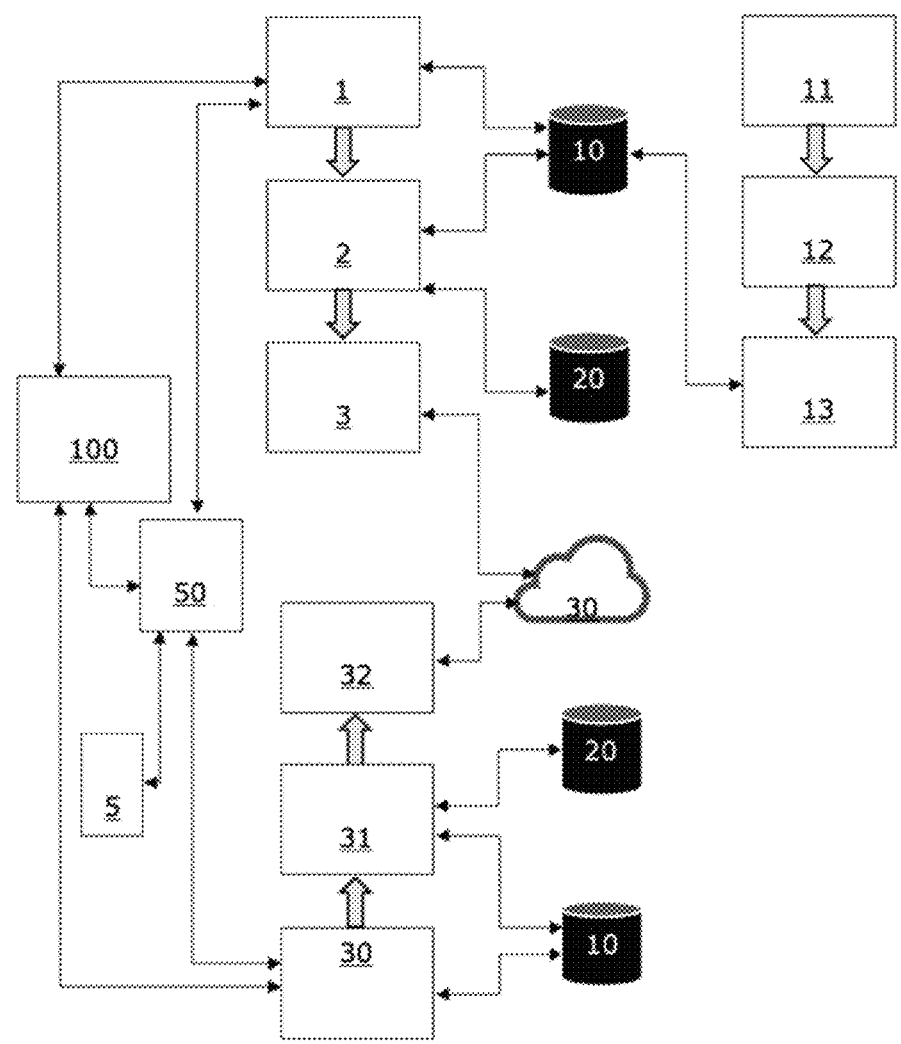

[FIG. 2]
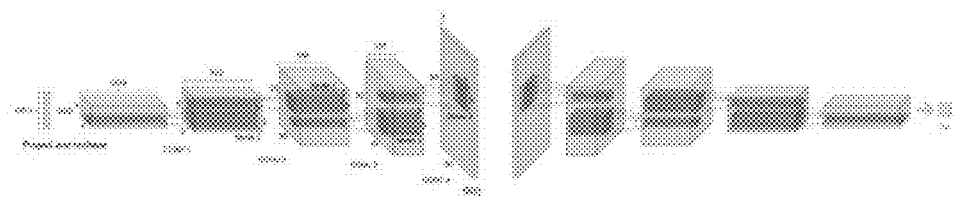
[FIG. 3]
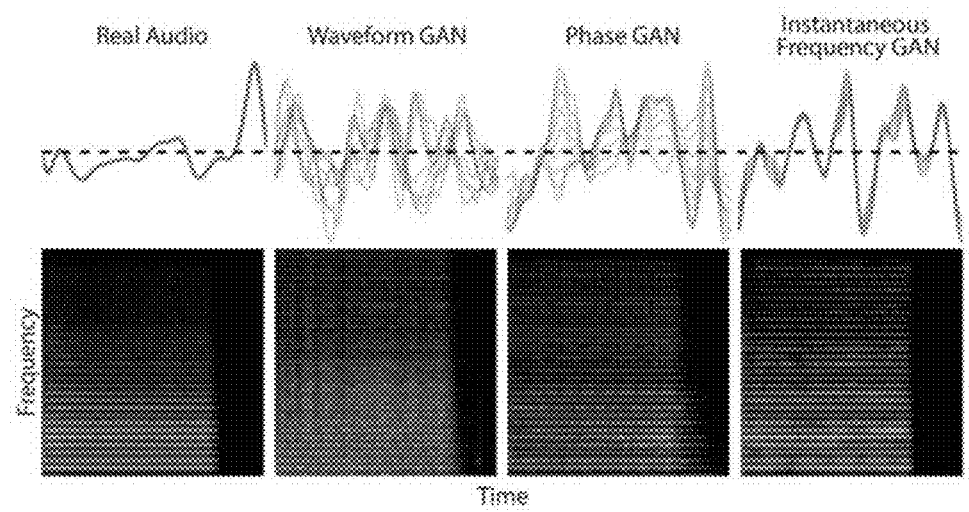

METHOD FOR AUTOMATICALLY PREDICTING THE EMOTIONAL EFFECT PRODUCTED BY A VIDEO GAME SEQUENCE

FIELD OF THE INVENTION

The present invention relates to the field of video games, and more particularly to the automatic adaptation of the gaming experience to the emotional reaction of the players, in an individualized manner.

BACKGROUND OF THE INVENTION

In video games, the accuracy and the depth of the gameplay mechanics, as well as the design of a level, and of the artificial intelligence of a character, can be a source of emotion that depends in part on the progress of the game, and on the player's temperament as well as on their play experience and their past and current challenge-skill interaction. The purpose is to culminate in an optimal experience corresponding to a compelling state in which the player successfully avoids the anxiety of a goal that is too difficult to achieve and the boredom of one that is too easy.

With a narrative video game, in which the player adopts the concerns and the objectives posed by the game and its storyline, video-game emotions can result from the feeling of guilt at having done wrong, fear at being unable to flee a monster, joy at having accomplished a feat, or disappointment at the unfortunate consequences that a negative outcome has on sympathetic fictional characters.

The most advanced video games seek to seamlessly interleave and arrange together artistic, fictional and videogame emotions through stylistic choices and coherent narrative motivation, including the animation of characters, sound mixing, and level design. The game designer must take into account the fact that the player has two contradictory desires: One of an immediate order, which is to avoid failure; the other of an aesthetic order, which is to take part in an experience that includes a partial failure.

The video and computer gaming industry offers numerous different approaches to improve the social aspects of the game experience, in particular by attempting to categorize the interactions between the player and the video game, and by attempting to model the emotional modes induced by the parameters of the game.

STATE OF THE ART

US patent 2020/298118 relates to a method consisting of generating, via a system including a processor, a gaming bot; receiving, via the system, game telemetry data of a gaming app corresponding to an actual player; generating, via the system, difference data based on the game telemetry data corresponding to an actual player and the game telemetry data corresponding to the gaming bot, the difference data indicating a difference over time between a first character generated by the actual player and a second character generated by the gaming bot; and updating, via the system, the gaming bot based on the difference data.

The purpose of this solution is to adapt a game to the experience and dexterity of the player, compared to the performance of a gaming bot, and takes into account the degree of satisfaction of the player according to the Likert scale and not their emotional state.

Also known are patents US2020206631 and US2020405212 as well as the article "M. S. Hossain, G. Muhammad, B. Song, M. M. Hassan, A. Alelaiwi and A. Alamri, "Audio-Visual Emotion-Aware Cloud Gaming Framework," in IEEE Transactions on Circuits and Systems for Video Technology, vol. 25, no. 12, pp. 2105-2118, December 2015, doi: 10.1109/TCSVT.2015.2444731."

DRAWBACKS OF THE PRIOR ART

The solutions of the prior art are not completely satisfactory because the dermo-galvanic signals are greatly disturbed by artifacts occurring at the interface between the sensors and the user's skin. When the user moves, the quality of the electrical link changes, and the data are thus noisy.

SUMMARY OF THE DISCLOSURE

In order to remedy these drawbacks, the present invention relates, according to its most general acceptance, to the automatic prediction of the emotional effect produced by a video game sequence having the technical features set out in claim 1.

The method comprises a step of labeling sequences of said game by automatically generating descriptors at time sequences of said game, characterized in that
  said labelling step consists in applying digital processing to the audio stream of said video game sequence using a neural network architecture (CNN) and a coding layer (NetFV or NetVLAD) for the task of identifying language, in order to extract a first series of timestamped descriptors, and in applying digital processing to the video stream in order to provide a second series of timestamped descriptors as a function of the colorimetric histogram, and in providing a third series of descriptors by a graphical component classifier, and transmitting them in the form of M-tuples to a neural network
  the method furthermore comprising processing biosignals generated by a means for acquiring the emotional state of at least one player in order to extract timestamped $S_{arousal}$ (t) value and $S_{valence}$ value (t) signals and transmit them in the form of N-tuples to a neural network
  the method furthermore comprising the processing by a neural network of said M-tuples and N-tuples in order to provide at least one indicator predicting the emotional state brought about by a type of audiovisual sequence.

According to a first variant, the M-tuples and the N-tuples are aggregated from one player upon multiple plays of the same video game.

According to a second variant, the M-tuples and the N-tuples are aggregated from multiple players using the same video game.

According to a specific embodiment, a segmentation of the player population is carried out, and in that the processing by the neural network of the aggregation of the M-tuples and of the N-tuples from one player upon multiple plays of the same video game is carried out for each of the segments.

The invention also relates to a method for automatically parameterizing video game sequences comprising a step of determining, for a video sequence, said predictive indicator of the emotional state induced by a type of audiovisual sequence by applying the aforementioned method, in that the measured indicator calculated from the processing of biosignals generated by a means of acquisition of the emotional state of a player is compared with measured time-stamped $S_{arousal}(t)$ value and $S_{valence}(t)$ value signals, in that said predictive indicator and said measured indicator are compared, and in that at least one parameter of at least one later video sequence is determined as a function of the distance between said indicators.

BRIEF DESCRIPTION OF THE DRAWINGS

The invention will be better understood on reading the following description, with reference to the appended drawings relating to a non-limiting example embodiment, in which:

FIG. 1 schematically shows the functional architecture

FIG. 2 shows a schematic view of an output image of the Deep Convolutional Generative Adversarial Network (DC-GAN).

FIG. 3 illustrates the results of this processing.

DETAILED DESCRIPTION

Functional Architecture

The following description illustrates an example functional architecture of the emotional effect prediction solution, making it possible to provide digital data intended to modify the progress of an individual or collective multimedia program.

Step (1): Image Recognition (Computer Vision)

This step consists in creating, based on the images taken from a video game (100), labeled training sets recorded in a memory (10), consisting of a series of images each associated with digital data corresponding to labels or classes, according to a terminology from a video game library.

All the objects and characters that may comprise monsters, animals, forks, swords (non-limiting) become classes.

Step (2) Training a neural model to recognize its classes. The categorization of scenes is a fundamental problem in computer vision, and it is appropriate to supplement the local training data of the database (10) with quality data coming from external verified sources (20). This is because research on scene understanding does not make it possible to capture the full variety of scene categories.

These local training data of the database (10) are used in the example described by a training engine, in addition to other data coming from external sources (20 such as SUN: SUN Database: Scene Categorization Benchmark (4919 Classes). The SUN (Scene UNderstanding) database contains 899 categories and 130,519 images. It uses 397 categories well-sampled to evaluate cutting-edge algorithms for scene recognition and to establish new performance limits.

The features of the SUN source are described for example in the following articles:

J. Xiao, J. Hays, K. Ehinger, A. Oliva and A. Torralba. SUN database: Large-scale scene recognition from abbey to zoo IEEE Computer Vision and Pattern Recognition (CVPR) Conference J. Xiao, KA Ehinger, J. Hays, A. Torralba and A. Oliva. SUN Database: Exploring a Large Collection of Scene Categories International Journal of Computer Vision (IJCV)

The result of this training step is the obtaining of several models (3) that recognize a plurality of object classes in an image frame.

For new games (11) whose objects are not yet known, a non-supervised automatic learning model is trained to automatically detect (12) the objects ("background-extracted softmasks (object detection)") and then manually labelling them (13) by an annotator who will assign to each extracted image one or more classes of objects of visual descriptors (monsters, swords, dog, etc.).

At the end of this step, there will be several models (3) that can be deployed in the cloud (30) which can recognize X classes of objects per frame.

The same types of treatments are applied to the audio signal from the video game (100). Additional labelled datasets (101) are created from audio sequences of a game (100).

The label makes it possible to describe the ambiance ("stressful, dynamic, epic, etc."). Labels with the least possible bias are used as well as pre-labelled ambiance audio datasets (201). A model (32) is also trained in a step (31) to recognize the volume from data (101), for example extracted from the system in real time, and the waveforms of the audio signal in an extraction step (30).

A new model is trained to recognize, for example, text in the audio of different languages from the waveforms and uses pre-trained models (201) to transcribe the text from the audio stream, such as those below (non-limiting): Multi-Purpose NLP Models (ULMFIT, Transformer, Google's BERT, Transformer-XL, OpenAI's GPT-2); Word Embeddings (ELMo, Flair) or StanfordNLP.

An artificial intelligence recognition model is also implemented to train text data in order to recognize the text displayed on-screen (subtitles or other information).

Creating a New Custom Dataset

The next step consists in creating a new set of labeled, timestamped training audio and image data (50) by associating the emotional values provided by a device (51) via a method as described in patent FR3100972A1. These data are recorded and stored from all the gameplays by the players using the cloud (30), image-by-image and audio streams. Then the recorded audio-visual stream is used as input data from the preceding algorithms:

The result of this processing is a new dataset with the following timestamped, synchronized labels:

Computer Vision Model Classes (SUN, etc.)
Monster/object classes (Video Game Datasets)
Ambiance and sound volume
Audio text
Image text
Arousal and valence A new model is then trained with the newly created labeled dataset: as input for the visual data: all the frames of the video stream (RGB) that we can resize to reduce the computing needs and the audio stream data using the Mel-Spec technique (128×128 pixels) representation (Grayscale) from the waveform of the audio stream and the emotional data (arousal valence). Therefore, the model should be able to predict an arousal/valence score from a frame and a series of audio representation (melspec images).

These models are then deployed on the cloud to provide a real-time prediction of the emotions before the players have actually played the game, simply from the video audio stream.

These predictions will be compared with the real emotional score from the algorithms of patent FR3100972A1 and a "LOSS" variable will be calculated in order to be able to refine the model permanently for all players.

For the generative part, for a given player. Upon each strong emotional reaction (Arousal>70) a specific emotional dataset is created by recording the audio and the images from the video stream. Thus, recorded emotional sequences (Arousal>70 and a valence score) are available. For example, fear/anger (Arousal>70 and valence <30) or joy (Arousal>70 and valence >70).

The sequences are transformed into new datasets are used as input data for object class recognition models. Only images are selected, or a monster is selected as a present class (probability of presence >90%).

After training the images of the 1000-epochs model, 128×128 low-resolution images are generated via a deep convolutional generative model (DCGAN).

At the same time, a new Generative Super Resolution model is trained from the high-resolution images of the recognized class.

These images generated automatically as a function of the processing of the emotional reactions of a player under consideration can constitute a library of images with a high impact on the player under consideration, and then used for a new personalized game model whose emotional impact is adapted to the player under consideration. The same is true for the audio sequences.

This model learned to reconstruct a high resolution image from a low resolution image. An output image of the Deep Convolutional Generative Adversarial Network is used to produce an output image of the resized 64×64 DCGAN models to be an input data of the SRGAN To obtain more realistic textures, a neural style transfer method is applied by processing the image with a convolutional filter to average it:

$$\text{kernal} = np \cdot \text{ones}((5, 5), np \cdot \text{float}32)/25$$

$$\text{img} = cv \cdot \text{filter2D}(\text{img}, -5, \text{kernal})$$

The style transfer is then applied with a pre-trained VGG19 model from a high-resolution image to obtain an image modified based on the emotional sequences.

Audio Stream Processing

A similar method is applied for the audio stream:
Creating emotional sequences, passing them from the audio classification algorithm (pitch/ambiance) to focus on a specific recognized environment.
Training an audio GAN model to create similar sequences
FIG. 3 illustrates the results of this processing.

The invention claimed is:

1. A method for automatically predicting an emotional effect produced by a video game sequence, comprising a step of labelling sequences of said video game by automatically generating descriptors at time sequences of said video game, wherein:
said labelling step consists in applying digital processing to an audio stream of said video game, using a neural network architecture and an NLP coding layer for identifying language, in order to extract a first series of timestamped descriptors, and in applying digital processing to a video stream of said video game in order to provide a second series of timestamped descriptors using a neural network architecture for characterizing scenes of each image of said video stream and for providing a third series of descriptors using a graphic component classifier, and transmitting said third series of descriptors in the form of M-tuples to a neural network
the method furthermore comprising processing biosignals generated by a means for acquiring an emotional state of at least one player in order to extract timestamped $S_{arousal}$ (t) and $S_{valence}$ (t) signals and transmit them in the form of N-tuples to said neural network
the method furthermore comprising processing said M-tuples corresponding to said timestamped descriptors of said first series and of said second series and said N-tuples using a neural network in order to provide at least one indicator predicting the emotional state brought about by a type of audiovisual sequence.

2. The method for automatically predicting the emotional effect produced by a video game sequence according to claim 1, wherein the M-tuples and the N-tuples are aggregated from one player upon multiple plays of the same video game.

3. The method for automatically predicting the emotional effect produced by a video game sequence according to claim 1, wherein the M-tuples and the N-tuples are aggregated from multiple players using the same video game.

4. The method for automatically predicting the emotional effect produced by a video game sequence according to claim 3, wherein a segmentation of a player population is carried out, and in that the processing by the neural network of the aggregation of the M-tuples and of the N-tuples from one player upon multiple plays of the same video game is carried out for each of the segments.

5. A method for automatically parameterizing video game sequences comprising a step of determining, for a video sequence, said predictive indicator of the emotional state induced by a type of audiovisual sequence by applying the method according to claim 1, in that a measured indicator is calculated from the processing of biosignals generated by a means of acquisition of the emotional state of a player and timestamped $S_{arousal}$ (t) value and $S_{valence}$ (t) value signals are calculated, in that said predictive indicator and said measured indicator are compared, and in that at least one parameter of at least one later video sequence is determined as a function of a distance between said indicators.

* * * * *